(12) United States Patent
Hsieh

(10) Patent No.: US 10,890,715 B1
(45) Date of Patent: Jan. 12, 2021

(54) LIGHT GUIDE MODULE WITH A PLURALITY OF LIGHT GUIDE COLUMNS AND A PLATE WITH PROTRUSIONS CONNECTED TO THE LIGHT OUTLET END OF EACH COLUMN

(71) Applicant: Delta Electronics, Inc., Taoyuan (TW)

(72) Inventor: Shih-Chi Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/856,671

(22) Filed: Apr. 23, 2020

(30) Foreign Application Priority Data

Jan. 21, 2020 (CN) .......................... 2020 1 0069275

(51) Int. Cl.
*G02B 6/24* (2006.01)
*H05K 5/02* (2006.01)

(52) U.S. Cl.
CPC .................. *G02B 6/24* (2013.01); *H05K 5/02* (2013.01)

(58) Field of Classification Search
CPC ....... G02B 6/4226; G02B 6/0008; G02B 6/24
See application file for complete search history.

(56) References Cited

U.S. PATENT DOCUMENTS

| 3,806,225 | A | 4/1974 | Codrino |
| 7,621,773 | B2 | 11/2009 | Bright et al. |
| 10,120,121 | B2 * | 11/2018 | Huang ................. G02B 6/0008 |

FOREIGN PATENT DOCUMENTS

| CN | 101749651 B | 8/2012 |
| CN | 204240130 U | 4/2015 |
| TW | I355225 B | 12/2011 |
| TW | M484897 U | 8/2014 |

* cited by examiner

*Primary Examiner* — Robert J May
(74) *Attorney, Agent, or Firm* — Kirton McConkie; Evan R. Witt

(57) ABSTRACT

A light guiding module includes a light guiding assembly and a plate. The light guiding assembly comprises a base, plural light guiding columns and plural first connection portions. The light guiding column comprises a light inlet end and a light outlet end. The first connection portions are connected between the light guiding columns. The plate comprises a first surface and plural extending portions. The first surface is abutted against the light outlet ends. The extending portions are extended from the first surface. The extending portion includes a first protrusion and a second protrusion. The second protrusions are disposed between the first protrusions and the first surface. A part of the first protrusions and the second protrusions of the extending portions are extended along a first direction, and a rest are extended along a second direction. The first connection portions are disposed between the first protrusions and the second protrusions.

15 Claims, 9 Drawing Sheets

LIGHT GUIDE MODULE WITH A PLURALITY OF LIGHT GUIDE COLUMNS AND A PLATE WITH PROTRUSIONS CONNECTED TO THE LIGHT OUTLET END OF EACH COLUMN

FIELD OF THE INVENTION

The present disclosure relates to a light guiding module, and more particularly to a light guiding module that the light guiding assembly and the plate thereof include corresponding fixing structures, respectively.

BACKGROUND OF THE INVENTION

To achieve multifunction and high performance, electronic devices are continuously developed toward high integration. With the miniaturization of electronic devices, component density of electronic device is gradually increased, and sizes of components are correspondingly reduced. Under this circumstance, it is important to maintain the accuracy of component assembly for keeping functions of electronic devices performing, properly.

Most of conventional electronic devices are provided with pattern displaying function to notify users of the state of the electronic device. Conventional pattern displaying function is achieved by a plurality of light guiding columns, which are utilized for transmitting light from a light source in the electronic device to the case of the electronic device so as to display the patterns on the case. For displaying corresponding patterns according to the requirements, there are two methods in prior arts. One of them is individually forming transparent patterns on the light outlet end portions of the light guiding columns. The other is forming transparent patterns on a decorative plate and making the light outlet end portions of the light guiding columns correspondingly connected to the patterns on the decorative plate, respectively. However, owing to the miniaturization of components, it is more difficult to form patterns on the light guiding columns, precisely, and hence the cost is increased. Besides, misalignments frequently occur during assembling the light guide columns, the decorative plate and the electronic device, and the patterns fail to be displayed properly as a result.

Therefore, there is a need of providing a light guiding module to address the drawbacks of prior arts and achieve the efficacies of miniaturizing the overall size of the light guiding module, reducing the cost of manufacturing the light guiding module and ensuring the assembling accuracy in followed process to provide excellent pattern displaying effect.

SUMMARY OF THE INVENTION

It is an object of the present disclosure to provide a light guiding module to address the above drawbacks encountered by the prior arts.

It is another object of the present disclosure to provide a light guiding module. By forming corresponding fixing structures on the light guiding assembly and the plate, respectively, the light guiding assembly and the plate can be combined easily and fixed firmly. As a result, the manufacturing cost of the light guiding module is reduced, the process of assembling the light guiding module to the electronic device is simplified, and the accuracy of the alignment of the light guiding assembly and the plate is ensured.

It is a further object of the present disclosure to provide a light guiding module. By the structural designs of the light guiding module, the problem of faint light, leaking light or uneven pattern brightness is reduced, so that excellent pattern displaying effect is achieved. In addition, component density of the electronic device is increased.

In accordance with an aspect of the present disclosure, a light guiding module is provided and includes a light guiding assembly and a plate. The light guiding assembly includes a base, a plurality of light guiding columns and a plurality of first connection portions. The plurality of light guiding columns include a plurality of light inlet end and a plurality of light outlet end. The light inlet ends are connected to the base. The first connection portions are connected between the light guiding columns. The plate includes a first surface and a plurality of extending portions. The first surface is abutted against and connected to the plurality of light outlet ends. The extending portions are extended from the first surface. Each of the plurality of extending portions includes a first protrusion and a second protrusion. Each of the second protrusions of the plurality of extending portions is disposed between each of the first protrusions of the plurality of extending portions and the first surface. A part of the first protrusions and the second protrusions are extended along a first direction, and a rest of the first protrusions and the second protrusions are extended along a second direction. The first connection portions of the light guiding assembly are disposed between the first protrusions and the second protrusions of the extending portions.

In an embodiment, the first direction and the second direction are opposite to each other.

In an embodiment, each of the first connection portions of the light guiding assembly and each of the first protrusions of the extending portions of the plate includes a chamfer.

In an embodiment, the light guiding assembly further includes a plurality of second connection portions connected between the light guiding columns, wherein the first protrusions of the extending portions of the plate and the second connection portions of the light guiding assembly are abutted against each other along the first direction or along the second direction.

In an embodiment, the light guiding assembly further includes a plurality of third connection portions connected between the light guiding columns and are located on a middle section of the light guiding columns.

In an embodiment, each of the first connection portions, the second connection portions and the third connection portions includes a section, and an area of the section is less than 2 mm$^2$.

In an embodiment, each of the first connection portions and the third connection portions includes a section, and an area of the section is less than 2 mm$^2$.

In an embodiment, the light guiding columns are connected to the base in a longitudinal arrangement.

In an embodiment, each of the light guiding columns includes a bending section being different length and different curved shape to each other, and the light guiding columns are arranged side by side in a vertical direction.

In an embodiment, the light guiding columns are connected to the base in a lateral arrangement.

In an embodiment, each of the light guiding columns includes a bending section being same length and same curved shape to each other, and the light guiding columns are arranged side by side in a horizontal direction.

In an embodiment, the bending section is chamfer and includes an inclined plane, and an angle between the inclined plane and a horizontal plane is in a range between 40 degrees and 50 degrees.

In an embodiment, the base includes a plurality of recess portions and a plurality of light inlet holes. The recess portions and the light inlet ends of the light guiding columns are respectively disposed on two opposite sides of the base and are spatially corresponding to each other. Sidewalls of the recess portions are inclined. The light inlet holes are correspondingly disposed in the recess portions.

In an embodiment, the plate further includes a second surface and two abutting portions. The second surface is opposite to the first surface, and an area of the second surface is equal to or less than the diameter of a groove of a case. The abutting portions are extended outwardly from two opposite ends of the plate and are disposed close to the first surface. When the plate and the case are assembled, the second surface is exposed from the case, and the abutting portions are abutted against an inner periphery of the groove of the case.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
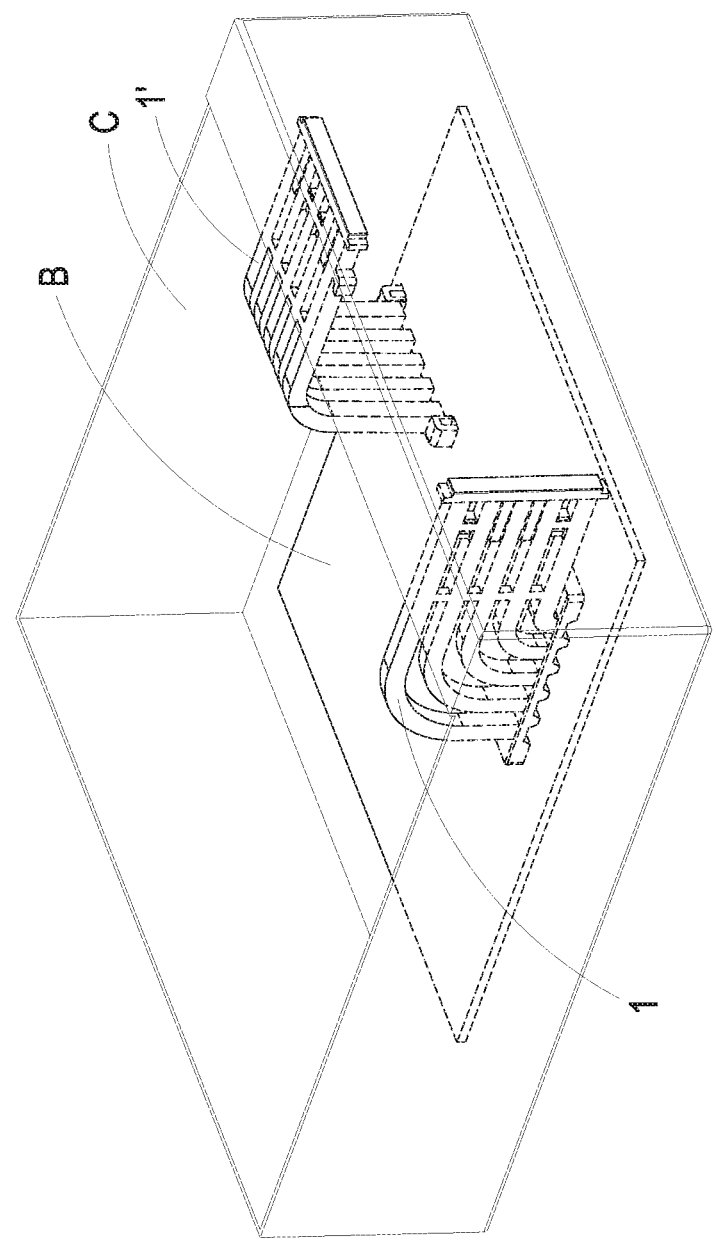
FIG. 1A is a schematic perspective view illustrating the light guiding modules according to a first embodiment and a second embodiment of the present disclosure and mounted in an electronic device.
Figure 1B:
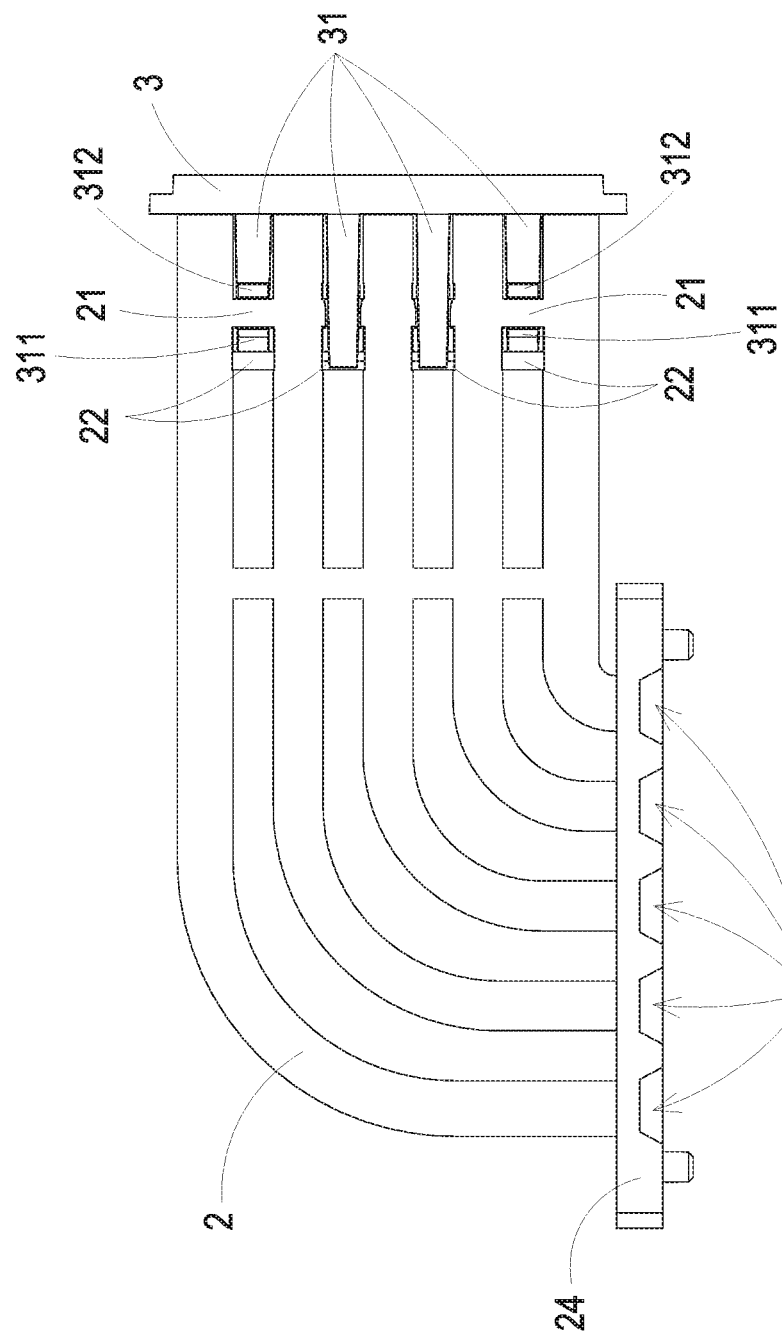
FIG. 1B is a schematic perspective view illustrating the light guiding module according to the first embodiment of the present disclosure.
Figure 2:
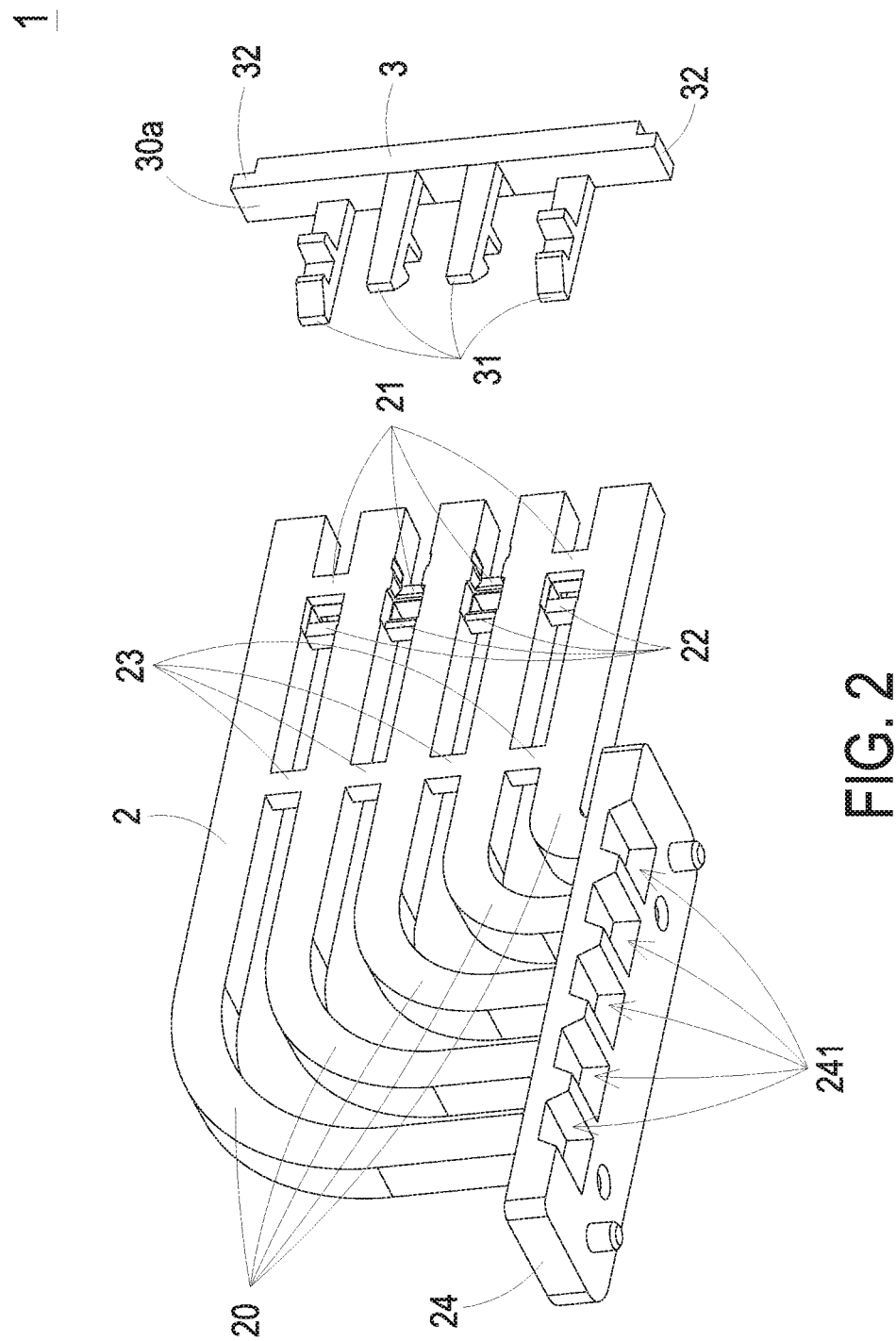
FIG. 2 is an exploded view illustrating the light guiding module according to the first embodiment of the present disclosure.
Figure 3:
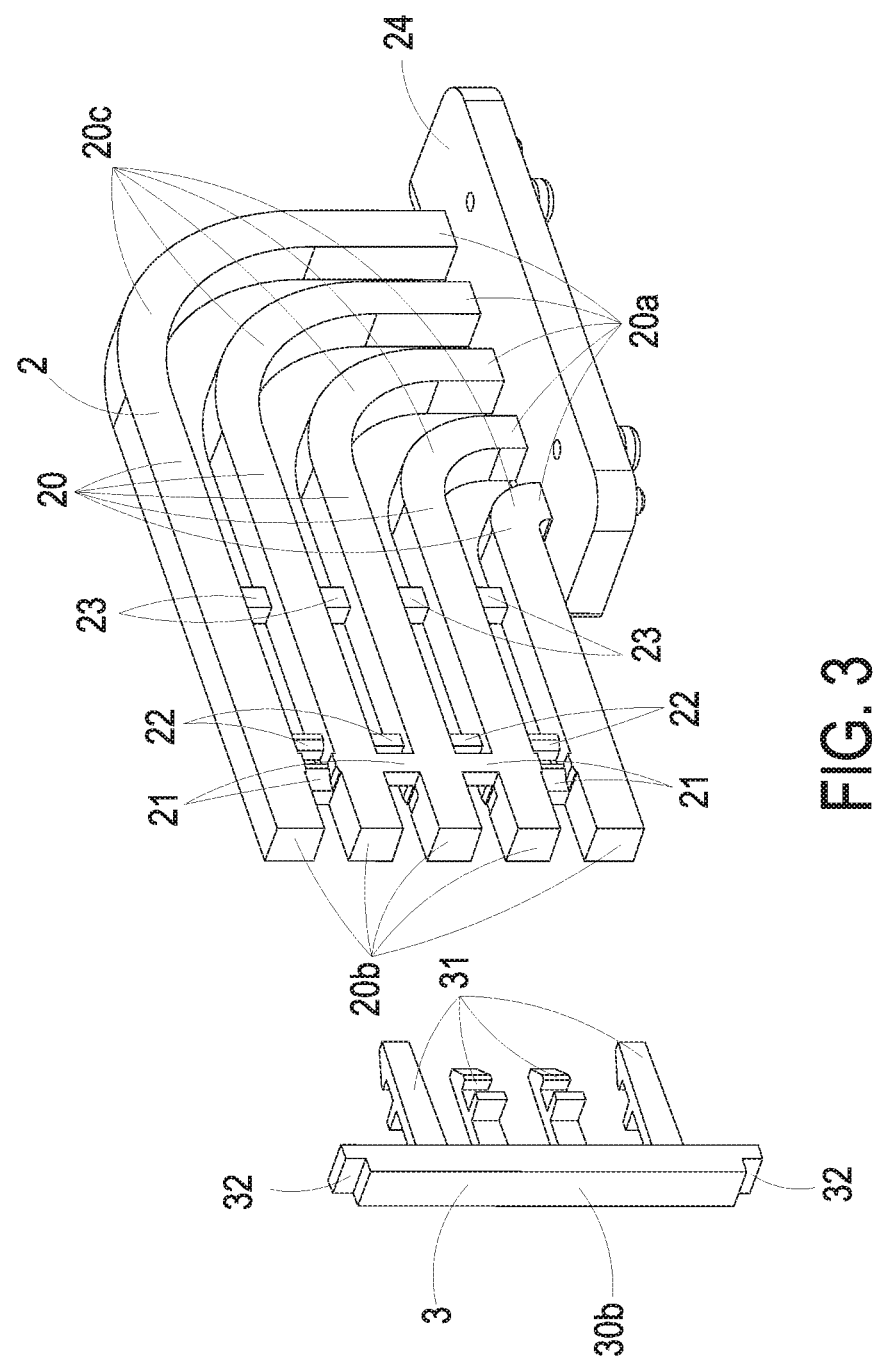
FIG. 3 is an exploded view illustrating the light guiding module of FIG. 2 and taken at a different observation angle.
Figure 4A:
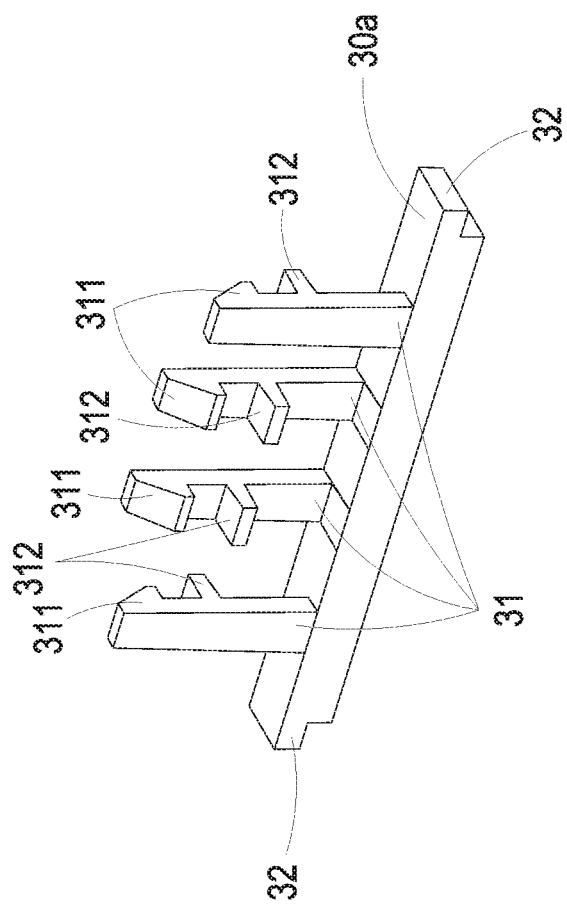
FIG. 4A is a schematic perspective view illustrating the plate of FIG. 2.

Please refer to FIGS. 1A, 1B, 2, 3 and 4A. FIG. 1A is a schematic perspective view illustrating the light guiding modules according to a first embodiment and a second embodiment of the present disclosure and mounted in an electronic device. FIG. 1B is a schematic perspective view illustrating the light guiding module according to the first embodiment of the present disclosure. FIG. 2 is an exploded view illustrating the light guiding module according to the first embodiment of the present disclosure. FIG. 3 is an exploded view illustrating the light guiding module of FIG. 2 and taken at a different observation angle. FIG. 4A is a schematic perspective view illustrating the plate of FIG. 2. As shown in the figures, a light guiding module 1 is provided and includes a light guiding assembly 2 and a plate 3. The light guiding assembly 2 is connected with a light source (not shown) on a board B inside an electronic device and transmits the light from the light source to the plate 3, so that patterns (not shown) on the plate 3 are displayed on a case C of the electronic device. The light guiding assembly 2 includes a base 24, a plurality of light guiding columns 20, a plurality of first connection portions 21 and a plurality of second connection portions 22. Each of the light guiding columns 20 comprises a light inlet end 20a and a light outlet end 20b. The light inlet ends 20a are connected to the base 24. The first connection portions 21 are connected between the light guiding columns 20. The second connection portions 22 are also connected between the light guiding columns 20. The plate 3 comprises a first surface 30a and a plurality of extending portions 31. The first surface 30a is abutted against and connected to the light outlet ends 20b of the light guiding columns 20, and the light outlet ends 20b are correspondingly connected to the patterns on the plate 3. The extending portions 31 are extended from the first surface 30a. Each of the extending portions 31 includes a first protrusion 311 and a second protrusion 312. The second protrusions 312 are disposed between the first protrusions 311 and the first surface 30a. A part of the first protrusions 311 and the second protrusions 312 of the extending portions 31 are extended along a first direction, and a rest of the first protrusions 311 and the second protrusions 312 of the extending portions 31 are extended along a second direction. The first connection portions 21 of the light guiding assembly 2 are disposed between the first protrusions 311 and the second protrusions 312 of the extending portions 31. By the combination of the light guiding assembly 2 and the plate 3, in comparison with individually forming patterns on the light outlet ends 20b of the light guiding columns 20, the manufacturing difficulty and cost are reduced, and the problem of misalignment, which frequently occurs when the light guiding assembly 2 and the plate 3 are separately assembled into the electronic device, is solved.

In this embodiment, the light guiding assembly 2 includes five light guiding columns 20, four first connection portions 21 and four second connection portions 22, but not limited thereto. The number of the extending portions 31 of the plate 3 is substantially corresponding to the number of the first connection portions 21 or the second connection portions 22. That is, in this embodiment, the plate 3 includes four extending portions 31. The first protrusions 311 and the second protrusions 312 of the two extending portions 31 located on the periphery of the plate 3 are extended along the first direction, and the first protrusions 311 and the second protrusions 312 of the two extending portions 31 located on the center of the plate 3 are extended along the second direction, but not limited thereto. In some embodiments, the extending portions 31 that the first protrusions 311 and the second protrusions 312 thereof are extended along the first direction and the extending portions 31 that the first protrusions 311 and the second protrusions 312 thereof are extended along the second direction are disposed in a staggered arrangement. In some embodiments, the light guiding assembly 2 includes four light guiding columns 20, three first connection portions 21 and three second connection portions 22. The plate 3 includes three extending portions 31. The first protrusions 311 and the second protrusions 312 of two of the extending portions 31 are extended along the first direction, and the first protrusions 311 and the second protrusions 312 of the rest of the extending portions 31 are extended along the second direction. It should be noted that the first connection portions 21 and the second connection portions 22 are not limited to be connected between every adjacent light guiding columns 20. In this embodiment, the light guiding columns 20 are arranged side by side in a vertical direction. The first connection portions 21 and the second connection portions 22 are connected between the light guiding columns 20 along the vertical direction. The first direction and the second direction are two opposite directions that perpendicular to the arranged direction of the light guiding columns 20. In this embodiment, the locations of the first connection portions 21 and the second connection portions 22 on the light guiding assembly 2 are adjusted according to the extended directions of the first protrusions 311 and the second protrusions 312 of the extending portions 31, i.e., according to the first direction or the second direction. By being fastened in two directions, the light guiding assembly 2 and the plate 3 are fixed with each other, firmly.

In this embodiment, the plate 3 has certain elasticity, so that the extending portions 31 are able to be deformed, slightly. Each of the first connection portions 21 of the light guiding assembly 2 and the first protrusions 311 of the extending portions 31 of the plate 3 includes a chamfer, and the chamfers of the first connection portions 21 and the chamfers of the first protrusions 311 are corresponding to each other, but not limited thereto. When the plate 3 and the light guiding assembly 2 are combined along the extending direction of the extending portions 31, owing to the deformation of the extending portions 31 and the chamfers, the first protrusions 311 are crossed through the first connection portions 21 of the light guiding assembly 2, and then the first connection portions 21 are fastened between the first protrusions 311 and the second protrusions 312 of the extending portions 31. In this embodiment, the first protrusions 311 of the extending portions 31 of the plate 3 and the second connection portions 22 of the light guiding assembly 2 are abutted against each other along the first direction or along the second direction. Meanwhile, the second protrusions 312 and the first connection portions 21 are abutted against each other. As a result, the plate 3 is prevented from rotating relative to the light guiding assembly 2 with the first connection portions 21 of the light guiding assembly 2 as an axis. In this embodiment, each of the second connection portions 22 also includes a chamfer so as to attach to the first protrusion 311, but not limited thereto. Consequently, by the first connection portions 21, the second connection portions 22, the first protrusions 311 and the second protrusions 312, the combination stability of the light guiding assembly 2 and the plate 3 is enhanced, the alignment of light outlet ends 20b of the light guiding assembly 2 and the patterns on the plate 3 is ensured, and the misalignment is avoided.

In this embodiment, the light guiding assembly 2 includes a plurality of third connection portions 23, which are connected between the light guiding columns 20 and located on a middle section of the light guiding columns 20. In other words, the third connection portions 23 are not connected with the extending portions 31 of the plate 3. The third connection portions 23 are mainly used to prevent the light guiding columns 20 from deformation and maintain the gaps between the light guiding columns 20, so as to enhance the structure stability of the light guiding assembly 2 and maintain the light transmission. In this embodiment, the number of the third connection portions 23 is equal to the number of the first connection portions 21 or the second connection portions 22, but not limited thereto.

Figure 4B:
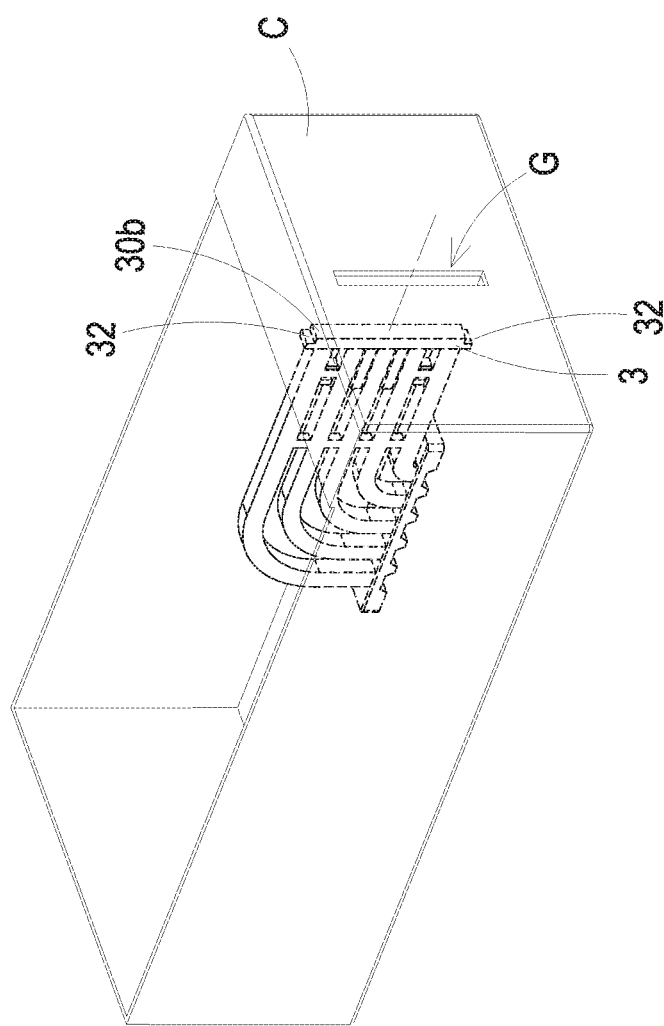
FIG. 4B is a schematic perspective view illustrating the light guiding module and the case according to the first embodiment of the present disclosure.

Please refer to FIGS. 4A and 4B. FIG. 4A is a schematic perspective view illustrating the plate of FIG. 2. FIG. 4B is a schematic perspective view illustrating a part of the light guiding module and the case according to the first embodiment of the present disclosure. In this embodiment, the plate 3 is made of transparent material. A plurality of transparent patterns are formed on the first surface 30a of the plate 3 by laser carving, for example but not exclusively. The patterns are spatially corresponding to the light outlet ends 20b of the light guiding columns 20 and are disposed between the extending portions 31. In this embodiment, the plate 3 further includes a second surface 30b and a plurality of abutting portions 32. The second surface 30b and the first surface 30a are opposite to each other, and the surface area of the second surface 30b is equal to or less than the diameter of a groove G of a case C of the electronic device. The abutting portions 32 are extended outward from the two ends of the plate 3 and are disposed close to the first surface 30a. That is, step structures are formed between the first surface 30a and the second surface 30b. When the plate 3 and the case C are assembled, the second surface 30b is exposed from the case C, and the abutting portions 32 are abutted against the inner periphery of the groove G of the case C. Consequently, the plate 3 is positioned to the groove G of the case C.

Figure 5:
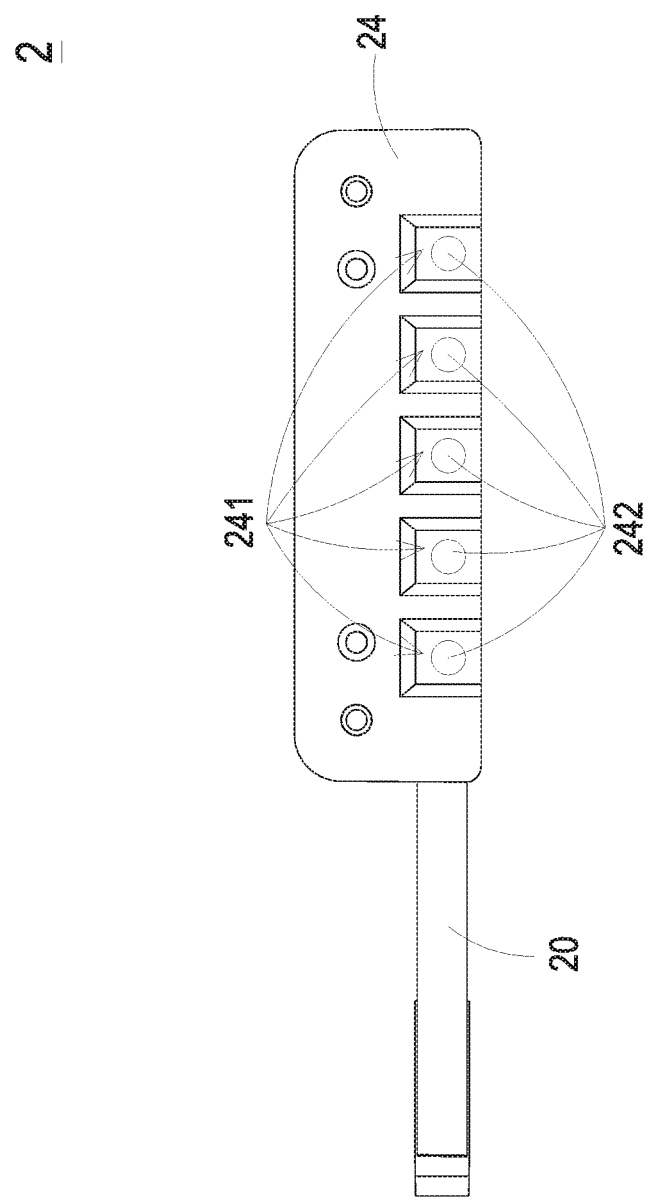
FIG. 5 is a bottom view illustrating the light guiding assembly of the light guiding module of FIG. 2.

Please refer to FIGS. 2 and 5. FIG. 5 is a bottom view illustrating the light guiding assembly of the light guiding module of FIG. 2. In this embodiment, the base 24 includes a plurality of recess portions 241 and a plurality of light inlet holes 242. The recess portions 241 and the light inlet ends 20a of the light guiding columns 20 are respectively disposed on the two opposite sides of the base 24 and are spatially corresponding to each other. The recess portions 241 are used to cover on the light source disposed on the board B. The light inlet holes 242 are corresponding to and disposed on the bottom surface of the recess portions 241 and are in circles, but not limited thereto. In this embodiment, the side walls of the recess portions 241 are inclined, so that the recess portions 241 are gradually shrunk from outside to inside for guiding light from the light source to the light inlet holes 242. Preferably, the diameter of the light inlet holes 242 is greater than the diameter of the light outlet ends 20b of the light guiding columns 20. Consequently, the light transmitted to the light outlet ends 20b of the light guiding columns 20 fills up the light outlet ends 20b, and the patterns on the plate 3 are completely displayed.

In this embodiment, the light guiding assembly 2 is made of transparent material and is formed integrally. Except for the light outlet ends 20b of the light guiding columns 20 and the light inlet holes 242 of the base 24, the outer surface of the light guiding columns 20 is coated with a light resistant layer, for example but not limited to silver paint. Thereby, the light of the light source can be transmitted from the light inlet holes 242 to the light outlet ends 20b through the interior path of the light guiding columns 20. It should be noted that the structures of the recess portions 241 and the shapes of the light inlet holes 242 of the base 24 are designed in consideration of the process of forming the light resistant layer, so that the coating effect is enhanced, and the problem of faint light and leaking light is reduced. Besides, since the first connection portions 21, the second connection portions 22 and the third connection portions 23 are made of transparent material, it is possible that the light inside one of the light guiding columns 20 is transmitted to another light guiding column 20 through the first connection portions 21, the second connection portions 22 or the third connection portions 23 owing to reflection. Therefore, in this embodiment, each of the first connection portions 21, the second connection portions 22 and the third connection portions 23 includes a section, whose normal vector is parallel to the vertical direction. The area of the section is less than a passage diameter. The passage diameter is a minimal diameter that the light inside the light guiding columns 20 is able to pass through, which is substantially equal to 2 mm$^2$, but not limited thereto. As a result, the light is prevented from being transmitted from a light guiding column 20 to another light guiding column 20. Consequently, the problem of faint light and leaking light is reduced, and the patterns are clearly displayed to avoid confusion.

In this embodiment, the light guiding columns 20 of the light guiding assembly 2 are connected to the base 24 in a longitudinal arrangement which is taken from the plate 3 side and are arranged side by side in a vertical direction. The lengths of the light guiding columns 20 are different from each other. Each of the light guiding columns 20 includes a bending section 20c. The bending section 20c is chamfer or arc, and the lengths and the curved shapes of the bending sections 20c of the light guiding columns 20 are different from each other. For example, the length of the light guiding column 20 close to the base 24 is shorter than the light guiding column 20 away from the base 24. The lengths of bending section 20c of the light guiding column 20 close to the base 24 is less than the light guiding column 20 away from the base 24, but not limited thereto. In some embodiments, the light guiding columns 20 are arranged side by side in a vertical direction, and all of the bending sections 20c thereof are in the same length and the curved shape. It should be noted that as long as the light inside the light guiding columns 20 can be reflected to the light outlet ends 20b through the bending sections 20c, the angle or the radian of the bending sections 20c can be adjusted according to practical requirements. In this embodiment, owing to the different lengths and the curved shapes of the bending sections 20c, the size of the light guiding assembly 2 can be shrunk, thereby facilitating the increase of the component density of the electronic device.

Figure 6:
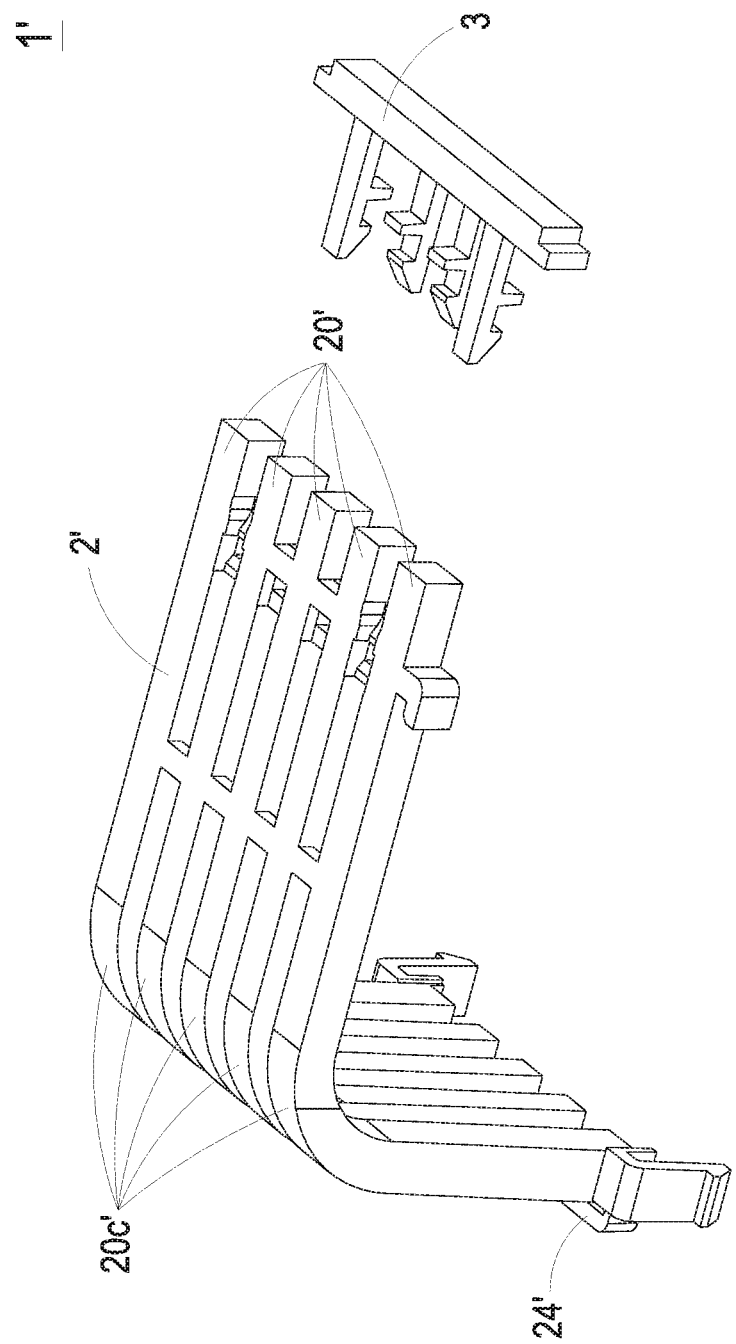
FIG. 6 is an exploded view illustrating the light guiding module according to the second embodiment of the present disclosure.

Please refer to FIG. 6. FIG. 6 is an exploded view illustrating the light guiding module according to the second embodiment of the present disclosure. In this embodiment, the structure of the light guiding module 1' is similar to the first embodiment. The difference is that the light guiding columns 20' of the light guiding assembly 2' are connected to the base 24' in a lateral arrangement which is taken from the plate 3 side, and are arranged side by side in a horizontal direction. The lengths of the light guiding columns 20' are equal to each other. Each of the bending sections 20c' of the light guiding columns 20' is an arc, and the lengths of the bending sections 20c are equal to each other, but not limited thereto. In this embodiment, when the light guiding module 1' is disposed in the electronic device, the other components can be disposed under the light guiding assembly 2', thereby increasing the component density of the electronic device. It should be noted that in this embodiment, since the lengths of the light guiding columns 20' are equal to each other, the light intensities at the light outlet ends 20b of the light guiding columns 20' are substantially the same, and the patterns displayed on the plate 3 have the same brightness. Consequently, the light guiding module 1' has better brightness uniformity than others.

Figure 7:
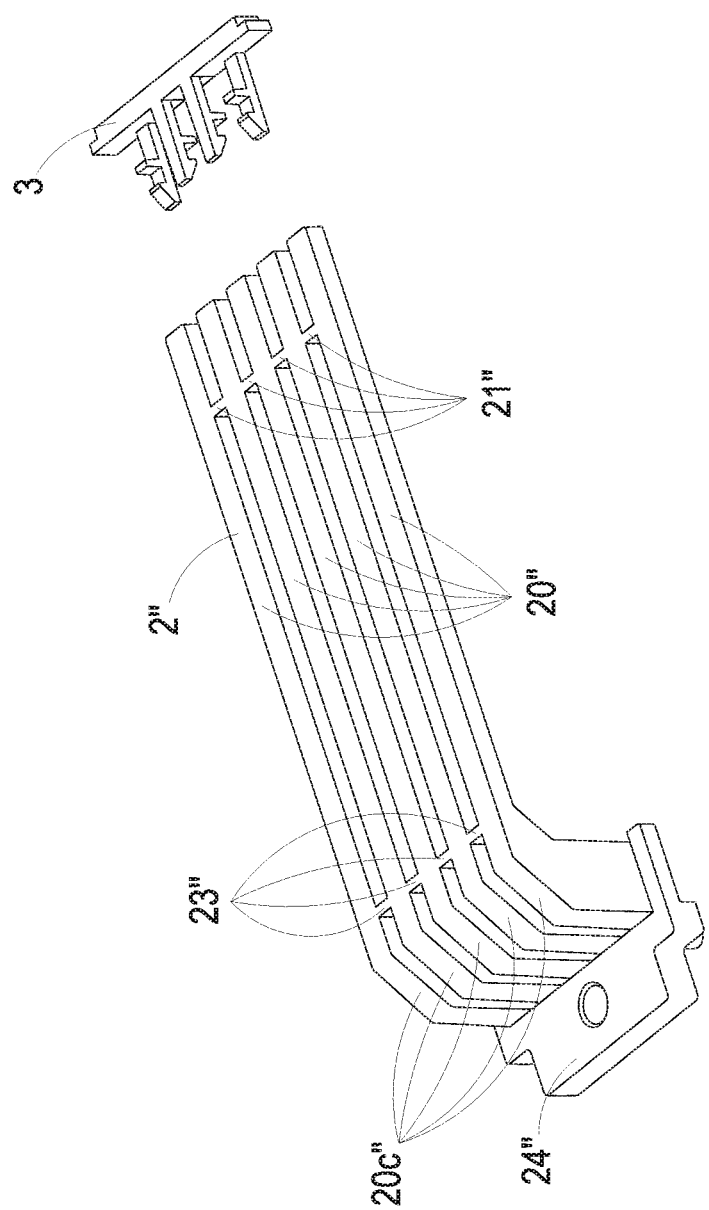
FIG. 7 is an exploded view illustrating the light guiding module according to a third embodiment of the present disclosure.

Please refer to FIG. 7. FIG. 7 is an exploded view illustrating the light guiding module according to a third embodiment of the present disclosure. In this embodiment, the structure of the light guiding module 1" is similar to the second embodiment. The difference is that the light guiding assembly 2" includes the base 24", the light guiding columns 20", the first connection portions 21" and the third connection portions 23". Each of the bending sections 20c" of the light guiding columns 20" is a chamfer and includes an inclined surface. In this embodiment, the angle between the inclined surface and a horizontal plane is in the range between 40 degrees and 50 degrees, but not limited thereto.

Please refer to FIGS. 1A, 1B, 6 and 7. As shown in the figures, the light guiding modules 1, 1', 1" can be fixed with the board B of the electronic device by screws (not shown) or fastening structures, and can further include protruding structures for positioning the light guiding modules 1, 1', 1" to the board B, but not limited thereto.

From the above descriptions, the present disclosure provides a light guiding module. By the combination of the light guiding assembly and the plate, the manufacturing cost is reduced, and the followed process of assembling the electronic device is simplified. By the first connection portions, the second connection portions of the light guiding assembly and the first protrusions, the second protrusions of the extending portions of the plate, the light guiding assembly and the plate can be fastened in two directions, so that the stability of the combination is enhanced, and the misalignment of the light outlet ends of the light guiding columns and the patterns on the plate is avoided. In addition, by the structural designs of the light guiding columns, the third connection portions, the recess portions and the light inlet holes of the light guiding assembly, the problem of faint light, leaking light or uneven pattern brightness is reduced, and the component density of the electronic device is increased.

While the disclosure has been described in terms of what is presently considered to be the most practical and preferred embodiments, it is to be understood that the disclosure needs not be limited to the disclosed embodiment.

What is claimed is:

1. A light guiding module, comprising:
   a light guiding assembly comprising:
      a base;
      a plurality of light guiding columns comprising a plurality of light inlet ends and a plurality of light outlet ends, wherein the light inlet ends are connected to the base; and
      a plurality of first connection portions connected between the light guiding columns; and
   a plate comprising:
      a first surface abutted against and connected to the plurality of light outlet ends; and
      a plurality of extending portions extended from the first surface, wherein each of the plurality of extending portions includes a first protrusion and a second protrusion, and each of the second protrusions of the plurality of extending portions is disposed between each of the first protrusions of the plurality of extending portions and the first surface, wherein a part of the first protrusions and the second protrusions are extended along a first direction, and a rest of the first protrusions and the second protrusions are extended along a second direction;

wherein the first connection portions of the light guiding assembly are disposed between the first protrusions and the second protrusions of the extending portions.

2. The light guiding module according to claim 1, wherein the first direction and the second direction are opposite to each other.

3. The light guiding module according to claim 1, wherein each of the first connection portions of the light guiding assembly and each of the first protrusions of the extending portions of the plate comprises a chamfer.

4. The light guiding module according to claim 1, wherein the light guiding assembly further comprises a plurality of second connection portions connected between the light guiding columns, wherein the first protrusions of the extending portions of the plate and the second connection portions of the light guiding assembly are abutted against each other along the first direction or along the second direction.

5. The light guiding module according to claim 4, wherein the light guiding assembly further comprises a plurality of third connection portions connected between the light guiding columns and are located on a middle section of the light guiding columns.

6. The light guiding module according to claim 5, wherein each of the first connection portions, the second connection portions and the third connection portions comprises a section, and an area of the section is less than 2 mm$^2$.

7. The light guiding module according to claim 1, wherein the light guiding assembly further comprises a plurality of third connection portions connected between the light guiding columns and are located on a middle section of the light guiding columns.

8. The light guiding module according to claim 7, wherein each of the first connection portions and the third connection portions comprises a section, and an area of the section is less than 2 mm$^2$.

9. The light guiding module according to claim 1, wherein the light guiding columns are connected to the base in a longitudinal arrangement.

10. The light guiding module according to claim 9, wherein each of the light guiding columns comprises a bending section being different length and different curved shape to each other, and the light guiding columns are arranged side by side in a vertical direction.

11. The light guiding module according to claim 1, wherein the light guiding columns are connected to the base in a lateral arrangement.

12. The light guiding module according to claim 11, wherein each of the light guiding columns comprises a bending section being same length and same curved shape to each other, and the light guiding columns are arranged side by side in a horizontal direction.

13. The light guiding module according to claim 12, wherein the bending section is chamfer and comprises an inclined surface, and an angle between the inclined surface and a horizontal plane is in a range between 40 degrees and 50 degrees.

14. The light guiding module according to claim 1, wherein the base comprises:
   a plurality of recess portions, wherein the recess portions and the light inlet ends of the light guiding columns are respectively disposed on two opposite sides of the base and are spatially corresponding to each other, wherein sidewalls of the recess portions are inclined; and
   a plurality of light inlet holes correspondingly disposed in the recess portions.

15. The light guiding module according to claim 1, wherein the plate further comprises a second surface and two abutting portions, wherein the second surface is opposite to the first surface, and an area of the second surface is equal to or less than a diameter of a groove of a case, wherein the abutting portions are extended outwardly from two opposite ends of the plate and are disposed close to the first surface, wherein when the plate is assembled in the case, the second surface is exposed from the case, and the abutting portions are abutted against an inner periphery of the groove of the case.

* * * * *